April 20, 1943.                L. T. SHERWOOD                2,316,993
                      CORRUGATED GLASS GLAZING UNIT
                          Filed July 20, 1940

WITNESS:
Rob R Mitchel.

INVENTOR
Laurence T. Sherwood
BY
Augustus B. Stoughton
ATTORNEY.

Patented Apr. 20, 1943

2,316,993

UNITED STATES PATENT OFFICE 2,316,993

CORRUGATED GLASS GLAZING UNIT

Laurence T. Sherwood, Connellsville, Pa., assignor to Pennsylvania Wire Glass Company, Philadelphia, Pa., a corporation of Pennsylvania Application July 20, 1940, Serial No. 346,469

2 Claims. (Cl. 20—56.5)

The principal object of the present invention is to provide prefabricated double glazing units of spaced sheets of corrugated glass, plain or wire, and these units have the advantage that they are installed in roofs, skylights or side walls without the use of marginal frames which conduct heat and, therefore, tend to defeat the object of spaced double glazing; another object of the invention is to provide prefabricated double glazing units of two spaced sheets of corrugated glass, wire or plain, which shall be self-draining in respect to water of condensation; another object of the invention is to provide for connecting the two spaced sheets of corrugated glass in such a way that necessary allowance is made for the effect of subjecting each of the sheets to different temperature; another object of the invention is to make it possible to employ lights of greater length than could be used in single sheets, remembering that corrugated glass is in use in structures supported at its ends; another object of the invention is to provide for connecting the two sheets of corrugated glass, while in spaced relation, together in such a way that the connecting means shall conform to the corrugations of the sheets and shall be sufficiently air-tight for the purpose.

Other objects of the invention will appear from the following description at the end of which the invention will be claimed.

Generally stated the invention consists in two sheets of corrugated glass, wire or plain, and one or both of which may be heat-absorbing glass, and the sheets being of substantially the same size and shape and arranged face to face in spaced relation with the corrugations ranging in the direction of the length of the sheets, and strips of glass fiber braid or fabric or glass fiber mat, including a binder, and interposed between the sheets and arranged at the side margins thereof, and elsewhere, if desired, and means for connecting the sheets and strips, providing a prefabricated double glazing unit; the means including an adhesive connecting the glass fibers and the glass sheets, or as a modification an adhesive tape marginal binding.

The invention also comprises the improvements to be presently described and finally claimed.

In the following description reference will be made to the accompanying drawing forming part hereof and in which.

Figure 1:
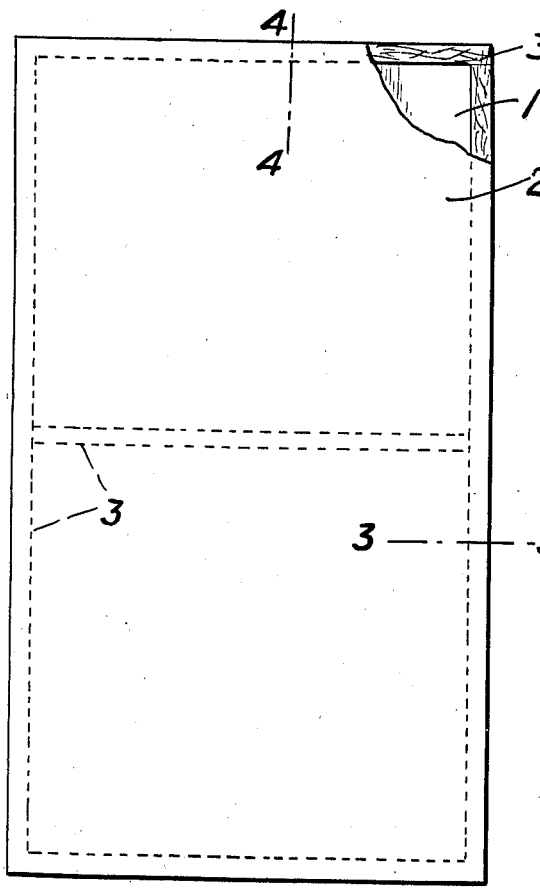
Figure 1 is a diagrammatic view of a double glazing unit embodying features of the invention and with parts broken away.
Figure 2:
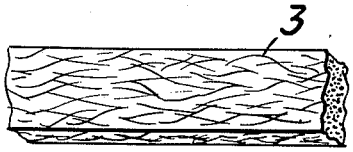
Figure 2 is a diagrammatic illustration of a strip of glass fiber mat drawn to an enlarged scale and such as is used between the two sheets of corrugated glass and such as is indicated in part by dotted lines in Figure 1.
Figure 3:
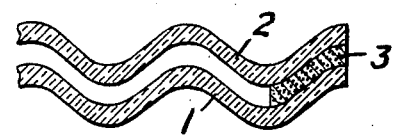
Figure 3 is an enlarged sectional view taken on the line 3—3 of Figure 1.
Figure 4:
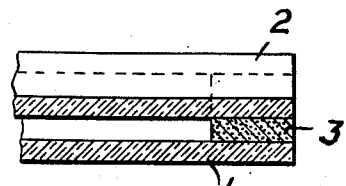
Figure 4 is a sectional view taken on the line 4—4 of Figure 1 but illustrating the corrugated form of the sheets.

Referring to the drawing:

1 and 2 indicate two sheets of corrugated glass, wire or plain, and they are of substantially the same size and shape and are arranged face to face in spaced relation and the corrugations range in the direction of the length of the sheets.

Referring more particularly to Figs. 1 to 4, inclusive, 3 is a strip of glass fiber felt or glass fiber mat as it is sometimes called, and it may well include a binder and an adhesive, which may be one and the same substance. The adhesive serves to interconnect the glass of the sheets and the glass fibers. Glass fiber mat consists of heterogeneously disposed loosely connected glass fibers and it is usually porous, or can be obtained in that condition, and it serves to drain away any water of condensation. Again the strips of fiber mat resemble cushions and accommodate difference in expansion or contraction of the sheets, due to the fact that they are exposed respectively to inside and outside temperatures. The strips 3 may be arranged at all four margins of the sheets of glass and if desired also at intermediate points. Corrugated glass sheets are usually supported at their ends and in the case of single sheets their length is limited by their inherent strength and by the added strength of the corrugated form. However, in the case of the prefabricated double glazing units when connected by strips of glass fiber mat, appropriately disposed, the strength of both sheets is available and in consequence the length of the light may be increased.

Prior to assembly, the strips or mats made of glass fibers are wetted or in some manner treated with a material which is to serve as an adhesive. Such material may be thermosetting or thermoplastic or of the nature of glue. It will suffice if the adhesive is applied only to the longitudinal strips. In case provision is needed for particularly free drainage of the condensation which, under some conditions, can occur between the panes, it will be better to omit adhesive from the transverse strips, they being the ones through which drainage is necessary. Water will flow quite freely through mats of glass fibers, even though considerably compressed, if the fibers are free from other material which prevents flow. Since adhesives may tend to prevent flow, they should be omitted from the transverse strips. This requirement does not prevent the use of an appropriate binder in a mat. For example, I have found that phenol formaldehyde plastic serves satisfactorily as a binder in a mat even after the mat has been heated to a temperature of about 550° F. to alter the plastic (or to expel the lubricant used in the manufacture of the mat) so as to insure a free flow of water through the mat.

The double-glazing unit may be constructed by placing one of the sheets of corrugated glass, wire or plain, flatwise on a support, by applying strips 3 of glass fiber mat or bat above mentioned, by placing the second sheet of glass on the strips, by clamping the sheets together, having regard to the amount of space desired between the sheets and to the desired overall thickness of the unit, and by taking appropriate steps to cause setting of the adhesive before removal of the clamps.

Figure 5:
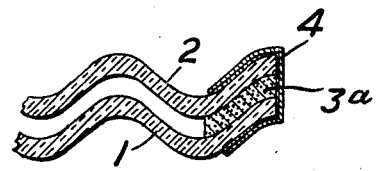
Figure 5 is a view similar to Figure 3 but illustrating a modification.

The construction and mode of operation of the modification shown in Figure 5 are as above described except that the strips 3a of glass fiber bat or mat need not be provided with an adhesive and may contain only a binder, and after they have been applied between the sheets of corrugated glass the sheets are pressed toward each other and adhesive tape 4 is applied to the margins of the sheets and extends inward therefrom along the faces to perhaps the width of a half of a corrugation. In this way the strips 3a are in compression.

In the event of breakage of one of the panes of a prefabricated double-glazing unit, it may be replaced in the field and without excessive inconvenience. It will be understood that the purpose of prefabricating the double-glazing unit is to facilitate its handling and installation.

If an extremely low transfer of heat is desired, the prefabricated units may consist of three or more panes assembled as described.

Whenever desirable to secure a high degree of diffusion of sunlight, it may be accomplished by interposing, between the panes of a double-glazing unit, a thin sheet made of glass fibers. This sheet is to be coextensive with the panes. Incidentally, it would reduce quantities of light and of radiant heat transmitted. It would also reduce the transfer of heat between indoor air and outdoor air.

Glass fiber mats possess a remarkable combination of characteristics as a result of which they impart new and beneficial properties and uses to glazing units of corrugated glass better than other materials. When the two panes are placed together, the glass fibers yield, as required, somewhat like putty, so that the marginal spaces are completely filled in order to exclude dust and prevent undue ingress or egress of air. But, unlike putty, the glass fiber mats do not subsequently harden, shrink, and leave cracks through which dust can enter and undue amounts of air can pass. By remaining permanently resilient, the mats continue to serve as cushions between the panes, thereby avoiding breakage of the glass incident to conditions of temperature, to distortion of structural steel, and the like, and they also continue to keep the marginal spaces filled so as to stay dust-tight and sufficiently airtight. There appears to be no other material which accomplishes these purposes so well while at the same time permitting free drainage of condensed water, and while also being immune to mildew, rotting, attack by insects, or to serious corrosion by the atmosphere or by condensation. Moreover, glass fiber mats are good thermal insulators and they are also inexpensive.

I claim:

1. A prefabricated self-draining dust-excluding corrugated glass glazing unit comprising two sheets of corrugated glass of substantially the same size and shape arranged face to face in spaced relation with the corrugations ranging in the direction of the length of the sheets, and strips of cushion like glass fiber mat interposed between the sheets and arranged at the margins thereof, the longitudinal strips being impervious to dust and the interstices between the fibers in the transverse strips being sufficiently small to exclude dust and large enough to pass water and means for binding the strips and the glass of the corrugated sheets together.

2. A prefabricated corrugated glass glazing unit comprising two sheets of corrugated glass of substantially the same size and shape arranged face to face in spaced relation with the corrugations ranging in the direction of the length of the sheets, strips of glass fiber mat, some including a binder and some including an adhesive, said strips being interposed between the sheets and arranged with those having adhesive at the longitudinal margins thereof, and those having binder at the transverse margins thereof, and said adhesive uniting the sheets and the glass fibers of the longitudinal strips.

LAURENCE T. SHERWOOD.